(12) United States Patent
Perelli et al.

(10) Patent No.: US 11,789,492 B2
(45) Date of Patent: Oct. 17, 2023

(54) COMPUTING DEVICE

(71) Applicant: Lenovo (Singapore) Pte. Ltd., Singapore (SG)

(72) Inventors: Thomas Perelli, Raleigh, NC (US); Cuong Huy Truong, Cary, NC (US); Ali Kathryn Ent, Raleigh, NC (US); Kathryn Marie Cubrilovic, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 127 days.

(21) Appl. No.: 17/087,329

(22) Filed: Nov. 2, 2020

(65) Prior Publication Data
US 2022/0137665 A1     May 5, 2022

(51) Int. Cl.
*G09G 5/38*         (2006.01)
*G06F 1/16*         (2006.01)

(52) U.S. Cl.
CPC .......... *G06F 1/1618* (2013.01); *G06F 1/1681* (2013.01); *G09G 5/38* (2013.01); *G09G 2340/0492* (2013.01)

(58) Field of Classification Search
CPC .................. G09G 5/38; G09G 2340/0492
See application file for complete search history.

(56) References Cited

U.S. PATENT DOCUMENTS

| | | | |
|---|---|---|---|
| 2015/0296060 A1* | 10/2015 | Gu .......................... | G06F 1/162 455/575.4 |
| 2018/0188774 A1* | 7/2018 | Ent ........................ | G06F 1/1616 |
| 2018/0188780 A1* | 7/2018 | Perelli ................... | G06F 1/1662 |
| 2018/0232010 A1* | 8/2018 | Kummer ............. | H04M 1/0235 |

* cited by examiner

*Primary Examiner* — Samantha (Yuehan) Wang
(74) *Attorney, Agent, or Firm* — Brian J. Pangrle

(57) ABSTRACT

An apparatus can include a processor; memory accessible to the processor; a first housing that includes opposing end edges, opposing side edges and a first display; a second housing that includes a second display; a third housing; a rail that guides translation of the first housing with respect to the second housing; a first hinge assembly that operatively couples the first housing and the second housing; and a second hinge assembly that pivotably couples the second housing and the third housing.

19 Claims, 13 Drawing Sheets

COMPUTING DEVICE

TECHNICAL FIELD

Subject matter disclosed herein generally relates to technology for computing devices.

BACKGROUND

Various types of computing devices have two housings where one of the housings is a display housing and the other one of the housings is a keyboard housing where the two housings are coupled by a hinge assembly.

SUMMARY

An apparatus can include a processor; memory accessible to the processor; a first housing that includes opposing end edges, opposing side edges and a first display; a second housing that includes a second display; a third housing; a rail that guides translation of the first housing with respect to the second housing; a first hinge assembly that operatively couples the first housing and the second housing; and a second hinge assembly that pivotably couples the second housing and the third housing. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
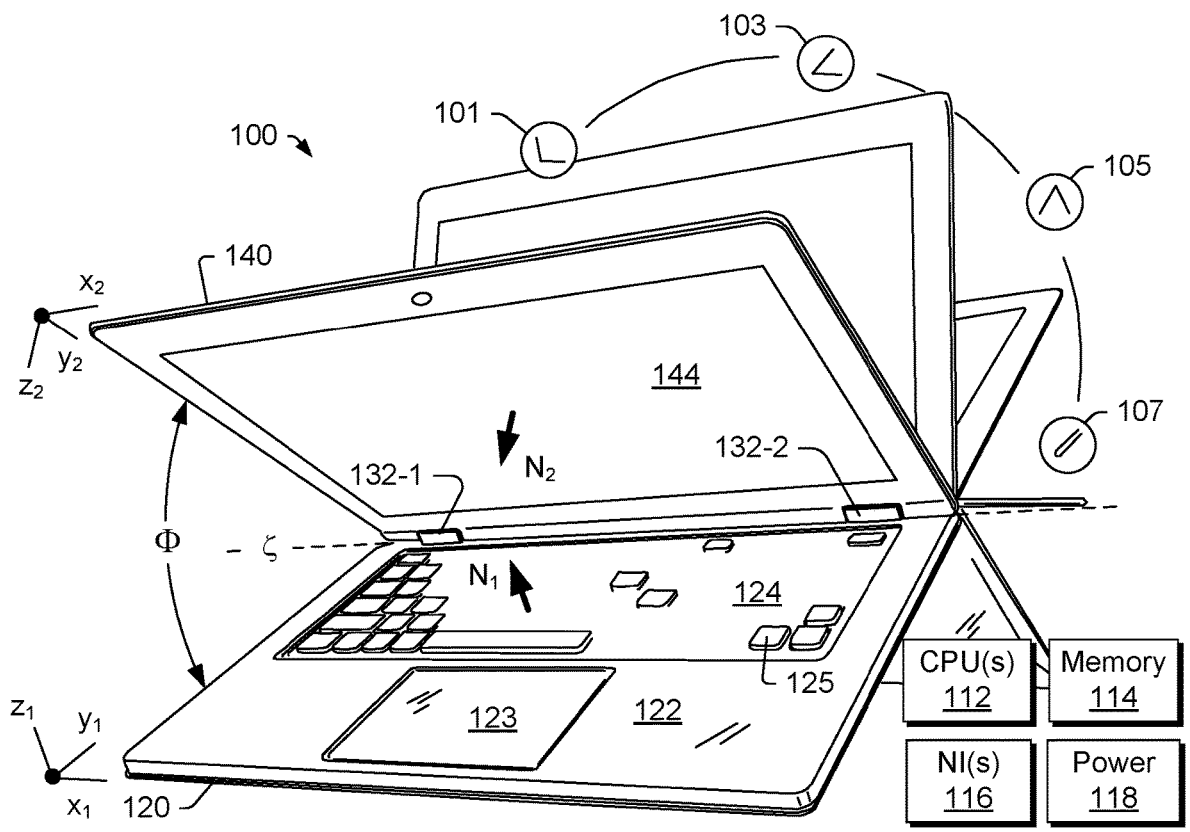
FIG. 1 is a series of diagrams of an example of a device.
Figure 1:
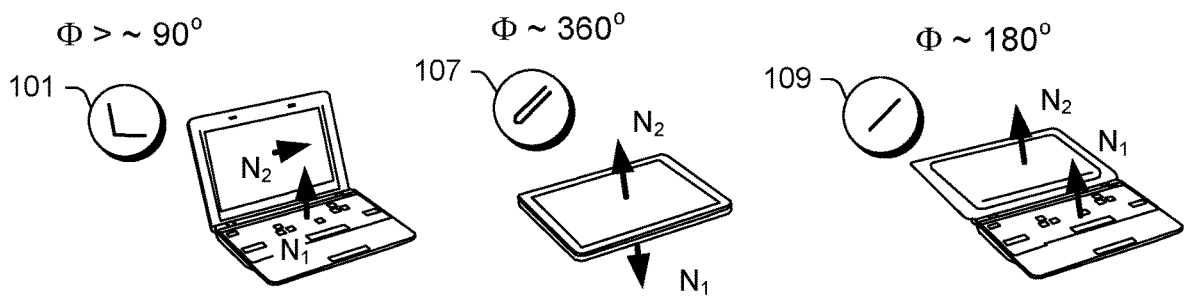

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a system such as, for example, a computing system (e.g., an information handling device, etc.).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed. In various examples, a footprint may be defined by an area such as an area in an x,y-plane.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing system to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 (e.g., normal to an $x_1,y_1$-plane) and a normal outward vector $N_2$ of the display 144 of the display housing 140 (e.g., normal to an $x_2,y_2$-plane) are oriented in oppositely pointing directions, pointing away from each other; whereas, in contrast, for a closed orientation of the device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the system 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
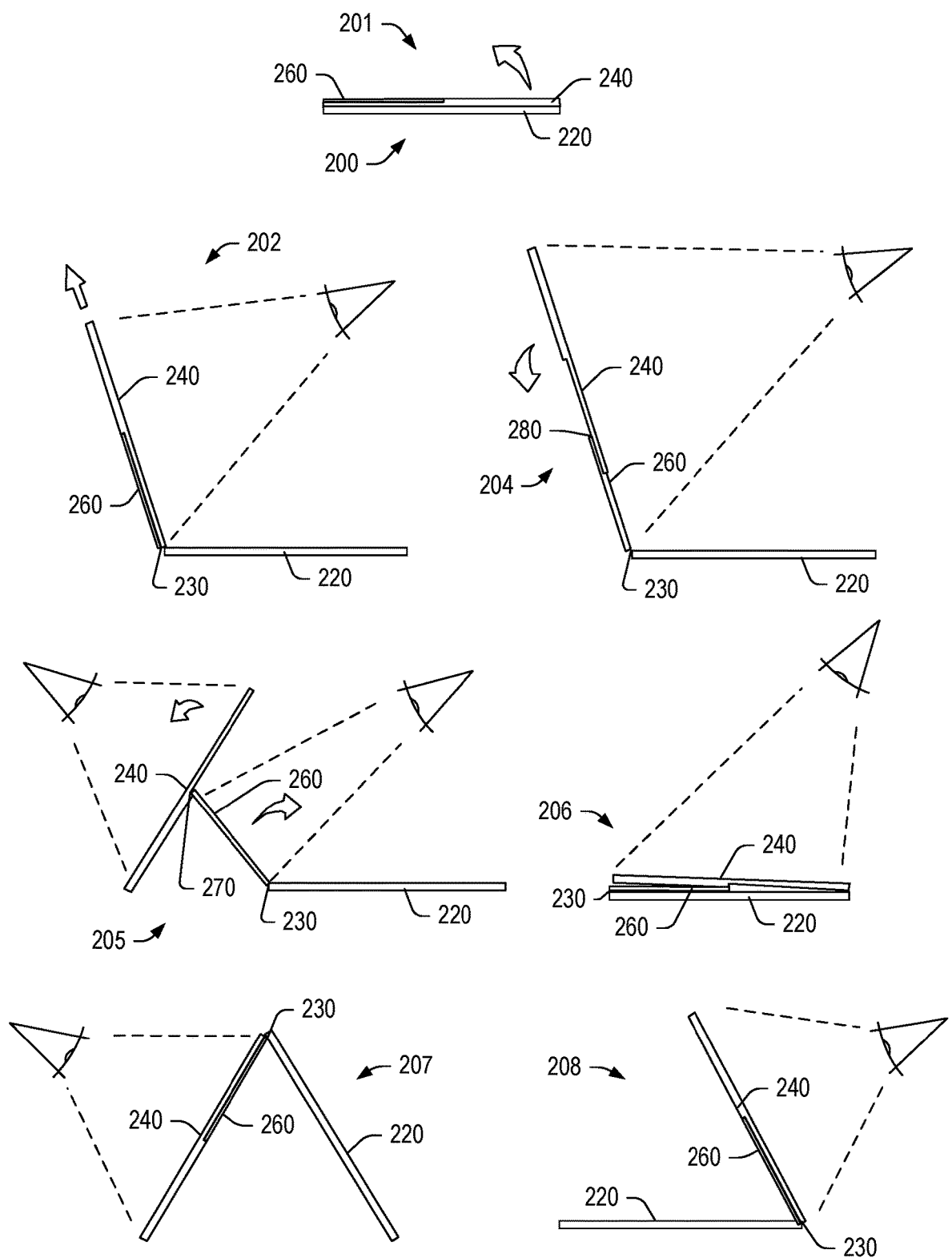
FIG. 2 is a series of diagrams of an example of a device.

FIG. 2 shows an example of a device 200 that includes a housing 220, a housing 240 and a housing 260. As shown, a hinge assembly 230 pivotably couples the housing 260 and the housing 220, a hinge assembly 270 operatively couples the housing 240 and the housing 260, and a rail 280 guides translation of the housing 240 with respect to the housing 260.

In the example of FIG. 2, various example orientations are shown including a closed orientation 201, an open orientation 202, an extended open orientation 204, a supported tent orientation 205, a tablet orientation 206, a tent orientation 207 and a supported display orientation 208. In FIG. 2, various normal vectors may be defined that can be utilized to characterize one or more of the orientations (e.g., optionally with respect to viewing of a display etc.).

FIG. 2 shows various eye graphics that represent examples of fields of view that a user or users may utilize in various orientations. For example, when the extended open orientation 204 is compared to the open orientation 202, the field of view (FOV) of a user can be increased as surfaces of the housings 240 and 260 are exposed in the extended open orientation 204; whereas, in the open orientation 202, a surface of the housing 240 is exposed for viewing and a surface of the housing 260 is covered (e.g., hidden). In the supported tent orientation 205, a tent shape is formed by the housing 240 and the housing 260 where the hinge assembly 230 pivotably couples the housing 260 to the housing 220 to support the housing 260 in the supported tent orientation 205. As shown, in the supported tent orientation 205, one user may view a surface of the housing 260 and another user may view a surface of the housing 240 where the housing 240 is pivoted about an axis of the hinge assembly 270. In such an example, the housing 220 can be in a plane, the housing 240 can be in a plane and the housing 260 can be in a plane where the planes differ. For example, the plane of the housing 220 may be horizontal or otherwise determined by a support surface and provide a reference from which to define angles of the other two planes where, for example, an edge of the housing 240 may be in the plane of the housing 220, for example, supported on the same support surface as the housing 220. As shown, in the supported tent orientation 205, the angle of the housing 260 with respect to the housing 220 is approximately 130 degrees and the angle of the housing 240 with respect to the housing 220 is approximately 60 degrees.

In FIG. 2, various examples of arrows indicate some examples of directions that various housings can move, for example, for transitioning from one orientation to another orientation. For example, one or more methods can include transitioning the device 200 from one orientation to another. As shown, various structural features provide for such transitions. As an example, a transition from the open orientation 202 to the extended open orientation 204 can occur by translation of the housing 240 with respect to the housing 260, for example, the housing 240 can be guided by the rail 280. As an example, such a rail may provide for various intermediate extended orientations, greater than a minimum, non-extended orientation and less than a maximum, fully-extended orientation. As an example, a transition may be made from the open orientation 202 to the supported tent orientation 205 by rotating the housing 240 with respect to the housing 260 using the hinge assembly 270. In the examples shown, such a rotation is illustrated as being counter-clockwise about an axis of the hinge assembly 270. Another arrow is shown with respect to the supported tent orientation 205, which may correspond to folding the housing 260 clockwise about an axis of the hinge assembly 230 such that the housing 240 is above the housing 220 as in the tablet orientation 206.

Figure 3:
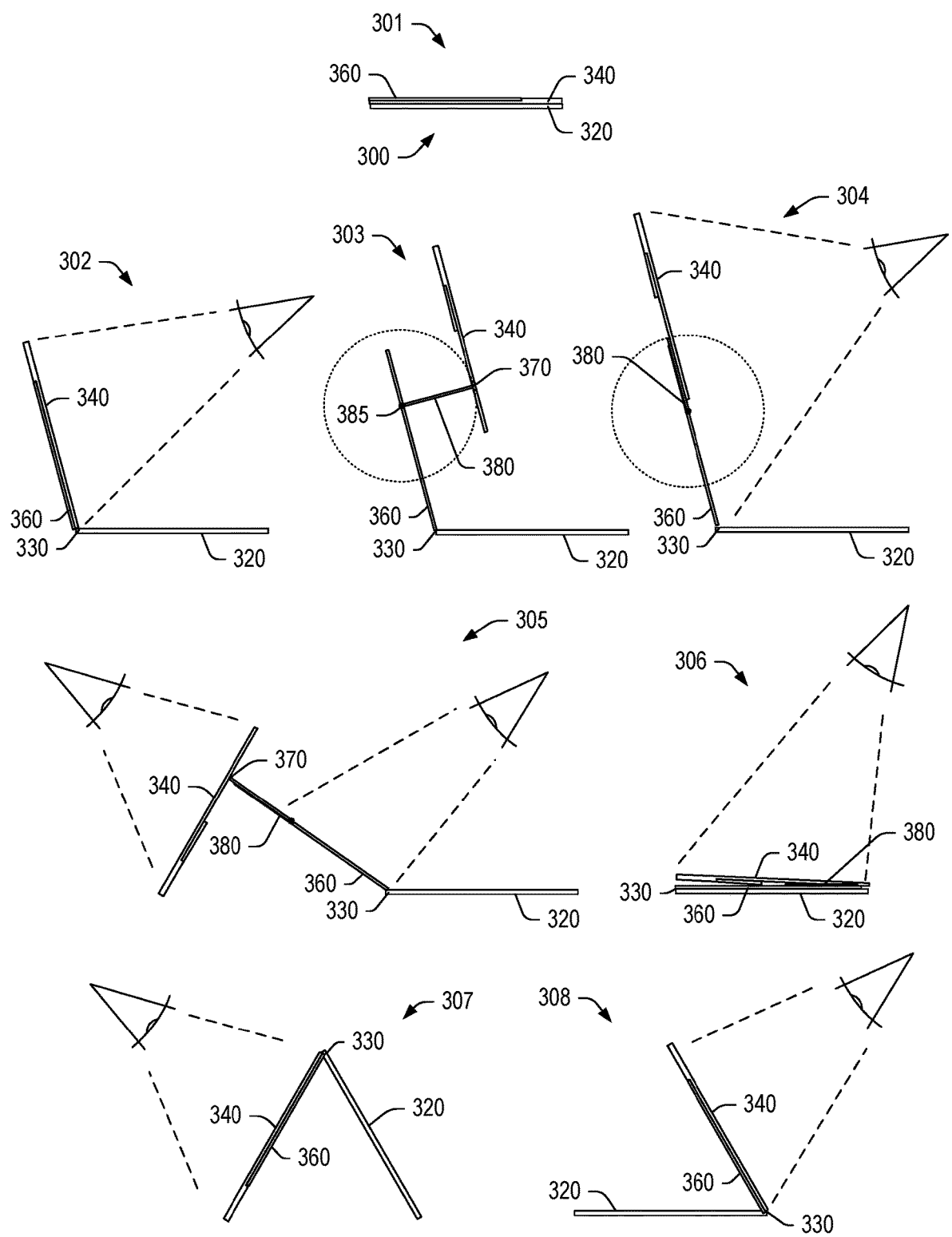
FIG. 3 is a series of diagrams of an example of a device.

FIG. 3 shows an example of a device 300 that includes a housing 320, a housing 340 and a housing 360. As shown, a hinge assembly 330 pivotably couples the housing 360 and the housing 320, a hinge assembly 370 operatively couples the housing 340 and the housing 360, and a rail 380 guides translation of the housing 340 with respect to the housing 360.

In the example of FIG. 3, various example orientations are shown including a closed orientation 301, an open orientation 302, a transitional orientation 303, an extended open orientation 304, a supported tent orientation 305, a tablet orientation 306, a tent orientation 307 and a supported display orientation 308. In FIG. 3, various normal vectors may be defined that can be utilized to characterize one or more of the orientations (e.g., optionally with respect to viewing of a display etc.).

FIG. 3 shows various eye graphics that represent examples of fields of view that a user or users may utilize in various orientations. For example, when the extended open orientation 304 is compared to the open orientation 302, the field of view (FOV) of a user can be increased as surfaces of the housings 340 and 360 are exposed in the extended open orientation 304; whereas, in the open orientation 302, a surface of the housing 340 is exposed for viewing and a surface of the housing 360 is covered (e.g., hidden). In the supported tent orientation 305, a tent shape is formed by the housing 340 and the housing 360 where the hinge assembly 330 pivotably couples the housing 360 to the housing 320 to support the housing 360 in the supported tent orientation 305. As shown, in the supported tent orientation 305, one user may view a surface of the housing 360 and another user may view a surface of the housing 340 where the housing 340 is pivoted about an axis of the hinge assembly 370. In such an example, the housing 320 can be in a plane, the housing 340 can be in a plane and the housing 360 can be in a plane where the planes differ. For example, the plane of the housing 320 may be horizontal or otherwise determined by a support surface and provide a reference from which to define angles of the other two planes where, for example, an edge of the housing 340 may be in the plane of the housing 320, for example, supported on the same support surface as the housing 320. As shown, in the supported tent orientation 305, the angle of the housing 360 with respect to the housing 320 is approximately 145 degrees and the angle of the housing 340 with respect to the housing 320 is approximately 60 degrees.

In FIG. 3, various examples of arrows indicate some examples of directions that various housings can move, for example, for transitioning from one orientation to another orientation. For example, one or more methods can include transitioning the device 300 from one orientation to another. As shown, various structural features provide for such transitions. As an example, a transition from the open orientation 302 to the extended open orientation 304 can occur by translation of the housing 340 with respect to the housing 360, for example, the housing 340 can be guided by the rail 380. For example, the rail 380 can guide translation during and/or after rotation of the rail 380 about an axle 385 that may operatively couple the rail 380 to the housing 360. As an example, such a rail may provide for various intermediate extended orientations, greater than a minimum, non-extended orientation and less than a maximum, fully-extended orientation. For example, the rail 380 may guide translation of the housing 340 with respect to the housing 360 such that the housing 340 may move upward or downward with respect to the housing 360 to provide for a desired amount of exposed surface of the housing 360.

As an example, a transition may be made from the extended open orientation 304 to the supported tent orientation 305 by rotating the housing 340 with respect to the housing 360 using the hinge assembly 370. In the examples shown, such a rotation is illustrated as being counter-clockwise about an axis of the hinge assembly 370. As an example, a transition from the supported tent orientation 305 to the tablet orientation 306 may occur by folding the housing 360 clockwise about an axis of the hinge assembly 330 such that the housing 340 is above the housing 320 as in the tablet orientation 306.

As an example, a device can be an apparatus that includes a processor; memory accessible to the processor; a first housing (e.g., the housing 240, the housing 340, etc.) that includes opposing end edges, opposing side edges and a first display (e.g., optionally operatively coupled to the processor); a second housing (e.g., the housing 260, the housing 360, etc.) that includes a second display; a third housing (e.g., the housing 220, the housing 320, etc.); a rail (e.g., the rail 280, the rail 380, etc.) that guides translation of the first housing with respect to the second housing; a first hinge assembly (e.g., the hinge assembly 270, the hinge assembly 370, etc.) that operatively couples the first housing and the second housing; and a second hinge assembly (e.g., the hinge assembly 230, the hinge assembly 330, etc.) that pivotably couples the second housing and the third housing.

Figure 4:
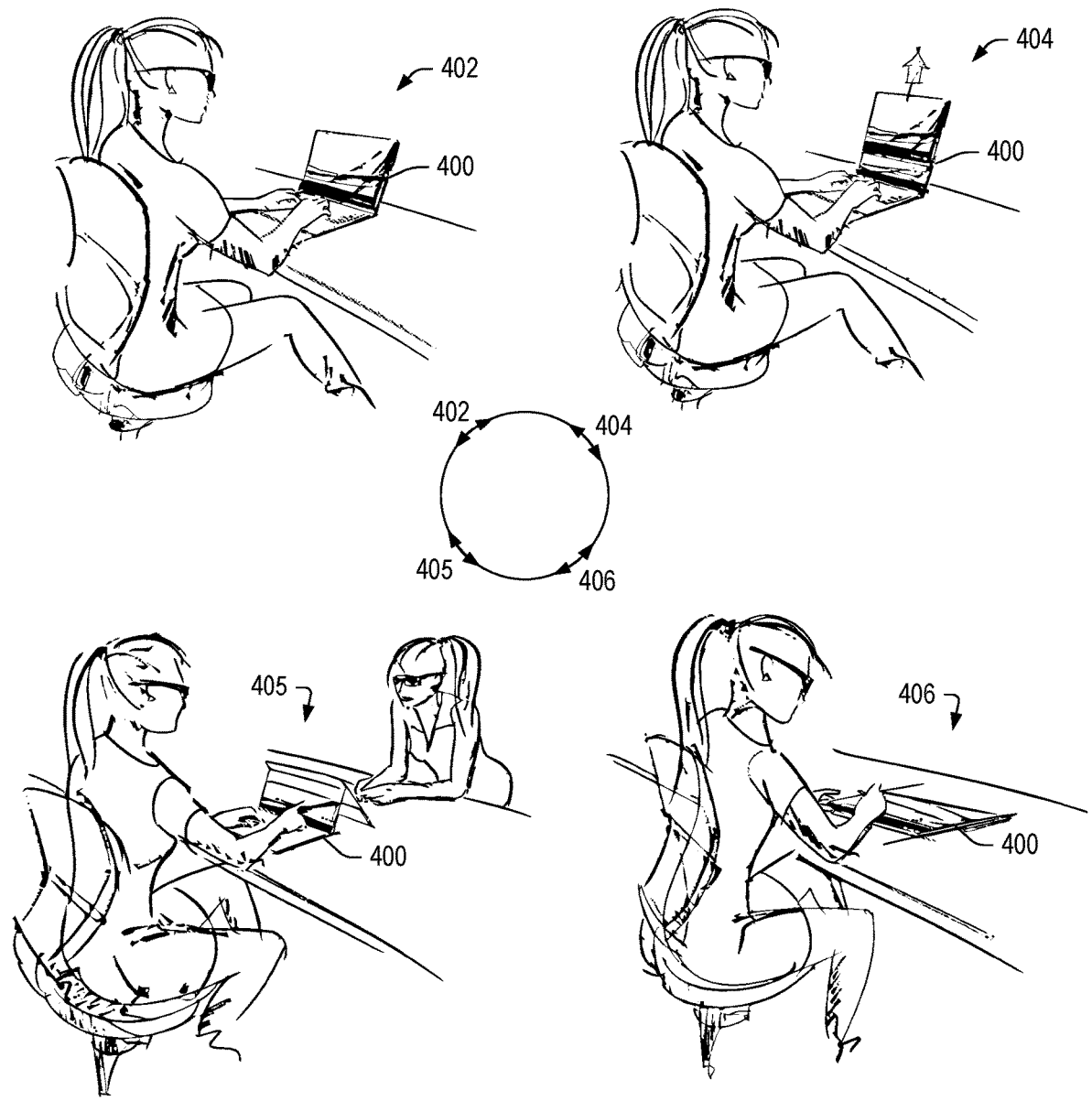
FIG. 4 is a series of diagrams of an example of a device.

FIG. 4 shows an example of a device 400 in various example orientations 402, 404, 405 and 406 where arrows indicate some examples of transitions between orientations. For example, a method can include transitioning the device 400 from one of the orientations 402, 404, 405 and 406 to another one of the orientations 402, 404, 405 and 406. As shown, the orientation 402 can be an open orientation, the orientation 404 can be an extended open orientation 404, the orientation 405 can be a supported tent orientation, and the orientation 406 can be a tablet orientation. The device 400 can include one or more features of the device 200, the device 300 and/or one or more other devices. As shown, the orientations 402, 404 and 406 of the device 400 may be suitable for use by an individual seated at a desk while the orientation 405 may be suitable for multiple individuals where the individuals may be facing each other where the device 400 is positioned between the individuals. As the device 400 can include two displays that can be oriented to face different directions, in the orientation 405, one of the displays may be angled for viewing by an individual while another one of the displays may be angled for viewing by another individual. In such an example, instructions may be received by the device 400 via one or more displays. For example, consider touch-screen displays where one individual may utilize one of the touch-screen displays and where another individual may utilized another one of the touch-screen displays.

Figure 5:
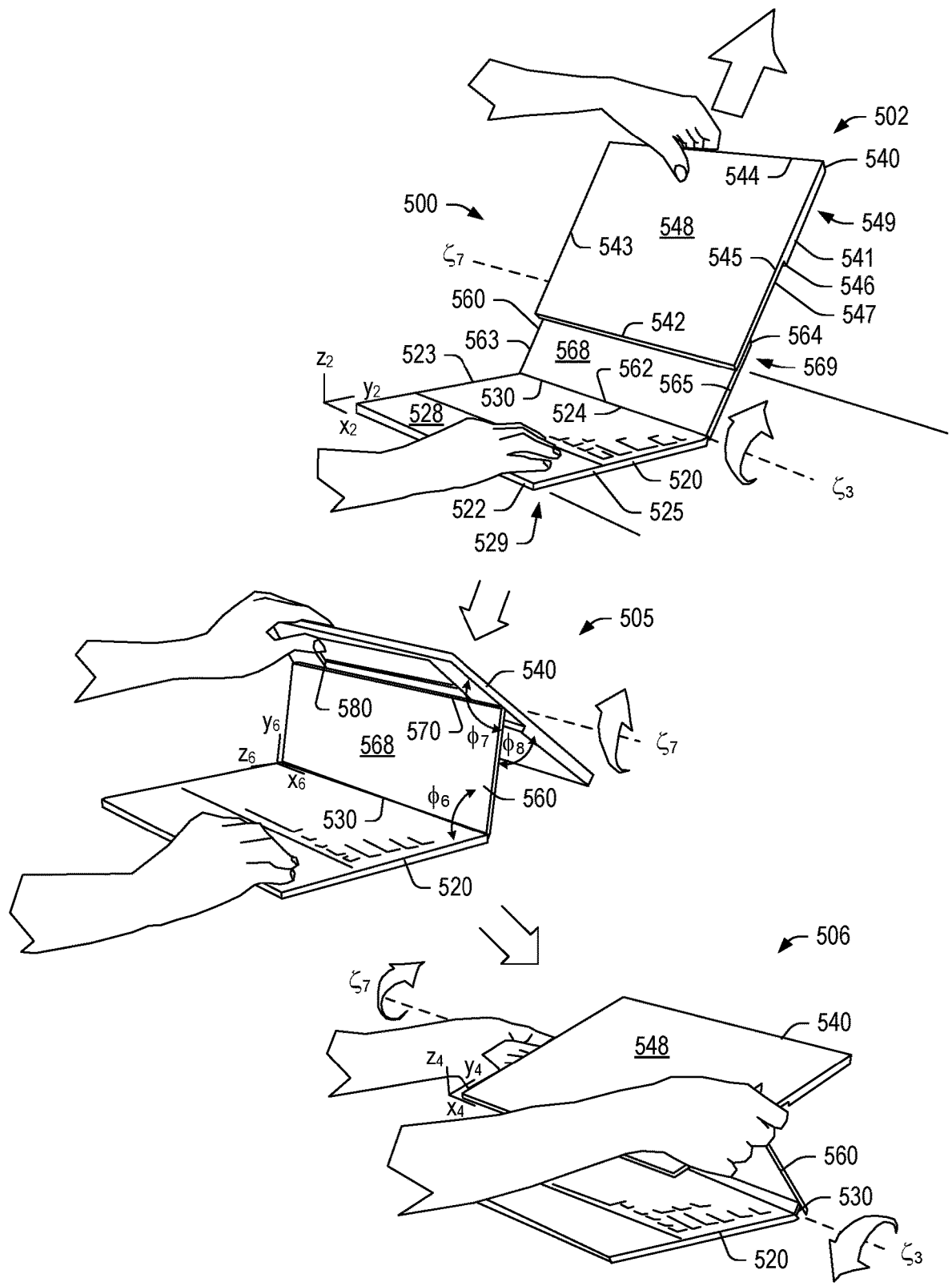
FIG. 5 is a series of diagrams of an example of a device.

FIG. 5 shows an example of a device 500 in various example orientations 502, 505 and 506 where a method can include transitioning the device 500 from the orientation 502 to the orientation 505 to the orientation 506. As shown, the device 500 includes housings 520, 540 and 560, hinge assemblies 530 and 570 and a rail 580. The device 500 can include one or more features of the device 100, the device 200, the device 300, the device 400 and/or one or more other devices. As shown, the orientation 502 can be an extended open orientation or a transitional orientation to an extended open orientation, the orientation 505 can be a supported tent orientation or a transitional orientation to a supported tent orientation, and the orientation 506 can be a transitional orientation to a tablet orientation.

FIG. 5 also shows various Cartesian coordinate systems, including $x_2$, $y_2$ and $z_2$ with respect to the housing 520, $x_4$, $y_4$ and $z_4$ with respect to the housing 540, and $x_6$, $y_6$ and $z_6$ with respect to the housing 560. As an example, the housing 520 can define an $x_2,y_2$-plane, the housing 540 can define an $x_4,y_4$-plane, and the housing 560 can define an $x_6,y_6$-plane. As explained with respect to the examples of FIG. 2, FIG. 3 and FIG. 4, one or more of such housing planes can be oriented using one or more hinge assemblies, such as the hinge assemblies 540 and 570 in FIG. 5. As to orientations of housing planes with respect to each other, consider, for example, the angles $\phi_6$, $\phi_7$, and $\phi_8$ where the angle $\phi_6$ is defined between the housings 520 and 560 via rotation about the hinge assembly 530 that defines a hinge axis $\zeta_3$ and where the angle $\phi_7$ is defined between the housings 560 and 540 via rotation about the hinge assembly 570 that defines a hinge axis $\zeta_7$; noting that the angle $\phi_8$ can be utilized to define an orientation where a sum of $\phi_7$ and $\phi_8$ is approximately 180 degrees (e.g., account for a thickness of the housing 560).

As shown in FIG. 5, the housing 520 can include a front edge 522 and a hinge edge 524, opposing side edges 523 and 525, a top surface 528 and a bottom surface 529. As shown in FIG. 5, the housing 540 can include opposing edges 542 and 544, opposing side edges 543 and 545, a display surface 548 and a back surface 549. As shown in FIG. 5, the housing 560 can include a lower hinge edge 562 and an upper hinge edge 564, opposing side edges 563 and 565, a display surface 568 and a back surface 569. In FIG. 5, the edges 522, 524, 542, 544, 562 and 564 may be referred to as end edges, for example, housing end edges.

As shown in FIG. 5, the housing 540 can include various portions 541, 546 and 547, which can include features on the back surface 569. For example, the portion 541 can be of a greater thickness (see, e.g., $z_4$) than the portion 547 where the portion 546 may be a step or a shoulder that is defined between the portions 541 and 547 (e.g., a step or a shoulder in a direction of $z_4$). As an example, the portion 547 can be a recessed portion that can accommodate the housing 560. In such an example, the recessed portion may extend between the side edges 543 and 545 a full width of the housing 540 or less than a full width of the housing 540. In such an example, when the housing 560 is received in a fully received state, the upper hinge edge 564 may be adjacent to the portion 546, for example, it may abut the portion 546 such that a gap does not exist, etc., such that the back surfaces 549 and 569 are relatively continuous (e.g., with a relatively thin joint formed between the 549 and 569). In such an example, in a closed orientation or an open orientation, the device 500 may appear to be a two housing clamshell device; whereas, translation and/or rotation of the housing 540 can reveal the housing 560. As an example, one or more magnets, magnet materials, etc., may be utilized to provide a magnetic force that helps to maintain an orientation of the housings 540 and 560. For example, consider the portion 546 and the edge 564 as including at least one magnet and/or consider the portion 547 and the housing 560 as including at least one magnet.

As an example, the hinge assembly 570 may be a sliding hinge assembly such that translation via the rail 580 provides for translation of the hinge assembly 570 with respect to the housing 540. For example, in an orientation where the housing 560 is fully received by the portion 547 of the housing 540, the hinge axis $\zeta_7$ may be adjacent to the portion 546 (e.g., as a transitional portion between the portions 541 and 547, which may be an edge of a recess). In the orientation 502, the upward movement of the housing 540 can cause the housing 540 to move relative to the hinge axis $\zeta_7$ such that the hinge assembly 570 is now at a different position with respect to the housing 540 (see, e.g., $y_4$), which between the edge 542 and the portion 546. In such an example, the housing 540 may form a longer leg of a triangle in a tent orientation. For example, in the orientation 505, a portion of the housing 540, forming a leg of a triangle of a tent, is longer than if the hinge axis $\zeta_7$ were positioned at the portion 546. In the example of FIG. 5, the rail 580 (e.g., or rails, etc.) may provide for positioning of at least a portion of the hinge assembly 570 with respect to the housing 540 while, for example, another portion of the hinge assembly 570 remains operatively coupled to the hinge edge 564 of the housing 560.

As an example, the aforementioned edges and surfaces may be utilized to define various dimensions. For example, the housing 520 can be defined by a width $\Delta x_2$, a depth $\Delta y_2$ and a thickness $\Delta z_2$, the housing 540 can be defined by a width $\Delta x_4$, a depth $\Delta y_4$ and a thickness $\Delta z_4$, and the housing 560 can be defined by a width $\Delta x_6$, a depth $\Delta y_6$ and a thickness $\Delta z_6$. As shown, the planar dimensions of the housing 520 can be approximately the same as the planar dimensions of the housing 540 while the planar dimensions of the housing 560 can be less than the planar dimensions of the housing 540. As explained with respect to FIG. 2 and FIG. 3, in the closed orientations 201 and 301, the housings 220 and 240 are substantially aligned and the housings 320 and 340 are substantially aligned. As an example, a closed orientation can define a footprint, which may be a footprint of a housing such as, for example, the housing 220, the housing 320, the housing 520, etc.

Figure 10:
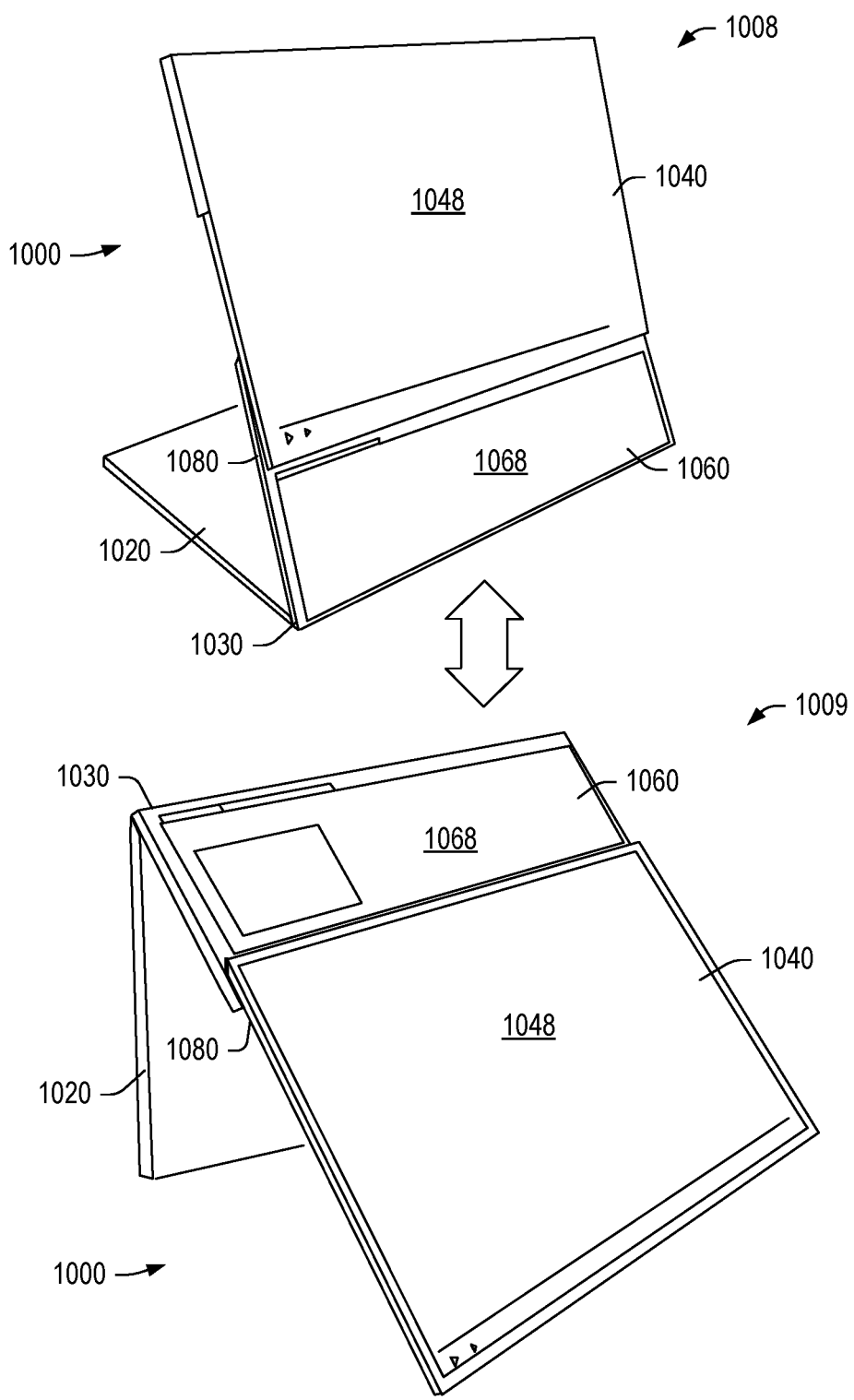
FIG. 10 is a series of diagrams of an example of a device.

As an example, the Cartesian coordinate systems, angles and axes shown in FIG. 5 may be utilized to describe one or more features, orientations, etc., of one or more devices as shown and/or described in various examples. For example, the supported tent orientations 205 and 305 can be described in part using the angles $\phi_6$, $\phi_7$, and $\phi_8$. As to the tent orientations 207 and 307, the angle $\phi_6$ is shown to be greater than 180 degrees; noting that a display surface of the housing 260 and a display surface of the housing 360 are not viewable; however, FIG. 10 shows an example of an extended tent orientation 1009 where display surfaces 1048 and 1068 are viewable. As an example, the example devices 200, 300, 400 and 500 may be positionable in extended tent orientations such that orientations can include a supported tent orientation, a tent orientation and an extended tent orientation.

As an example, a device may be described in part with respect to a single Cartesian coordinate system that can encompass three housings. For example, consider an x, y and z coordinate system where an x,y-plane can be defined by a support surface such as a desktop, a tabletop, a countertop, etc. In such an example, a total height of a device may be measured from the support surface. Where a housing such as, for example, one or more of the housings 220, 320, 520, etc., is substantially parallel to a support surface, it may define a base from which to describe one or more features. As an example, one or more of the housings 220, 320, or 520 may include one or more feet (e.g., on a bottom side 529 of the housing 520), which may be of a height of approximately 5 mm or less and may be provided such that an angle with respect to a support surface is defined. For example, a front edge may be disposed at a lesser height than a back edge such that a keyboard of a housing is disposed at an angle, which may be greater than approximately 0 degrees and less than approximately 20 degrees. As an example, the top surface 528, at the front edge 522 of the housing 520, may be at a lesser height than the top surface 529 at the hinge edge 524 of the housing 520.

Figure 6:
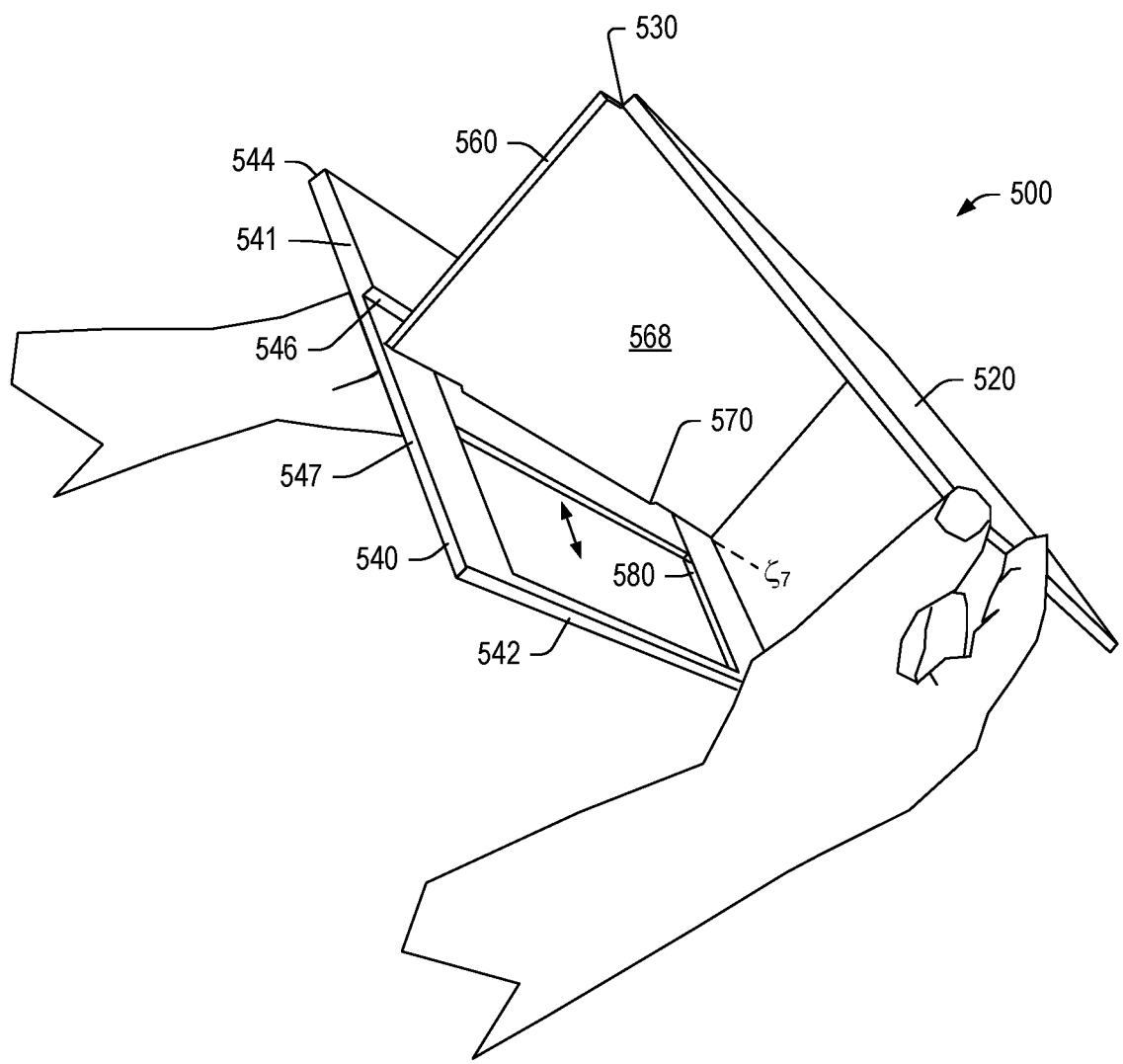
FIG. 6 is a diagram of the device of FIG. 5.

FIG. 6 shows the device 500 in an example orientation where the housing 520 is substantially parallel to the housing 540 and where the housing 560 is substantially orthogonal to the housing 520 and the housing 540. FIG. 6 shows the hinge axis $\zeta_7$ of the hinge assembly 570, which, as mentioned, can be positionable with respect to the housing 540 as indicated by a double-headed arrow. For example, the hinge axis $\zeta_7$ may be moved to a position that is between the portion 546 (e.g., a step, a shoulder, etc.) and the edge 542. In such an example, the housing 540 can be divided such that it extends a distance away from one side of the hinge assembly 570 to the edge 544 and extends a distance away from the other side of the hinge assembly 570 to the edge 542. As explained, the distance toward the edge 544 may provide for a tent orientation where the edge 544 is utilized to support the device 500 on a support surface, for example, along with the housing 520.

Figure 7:
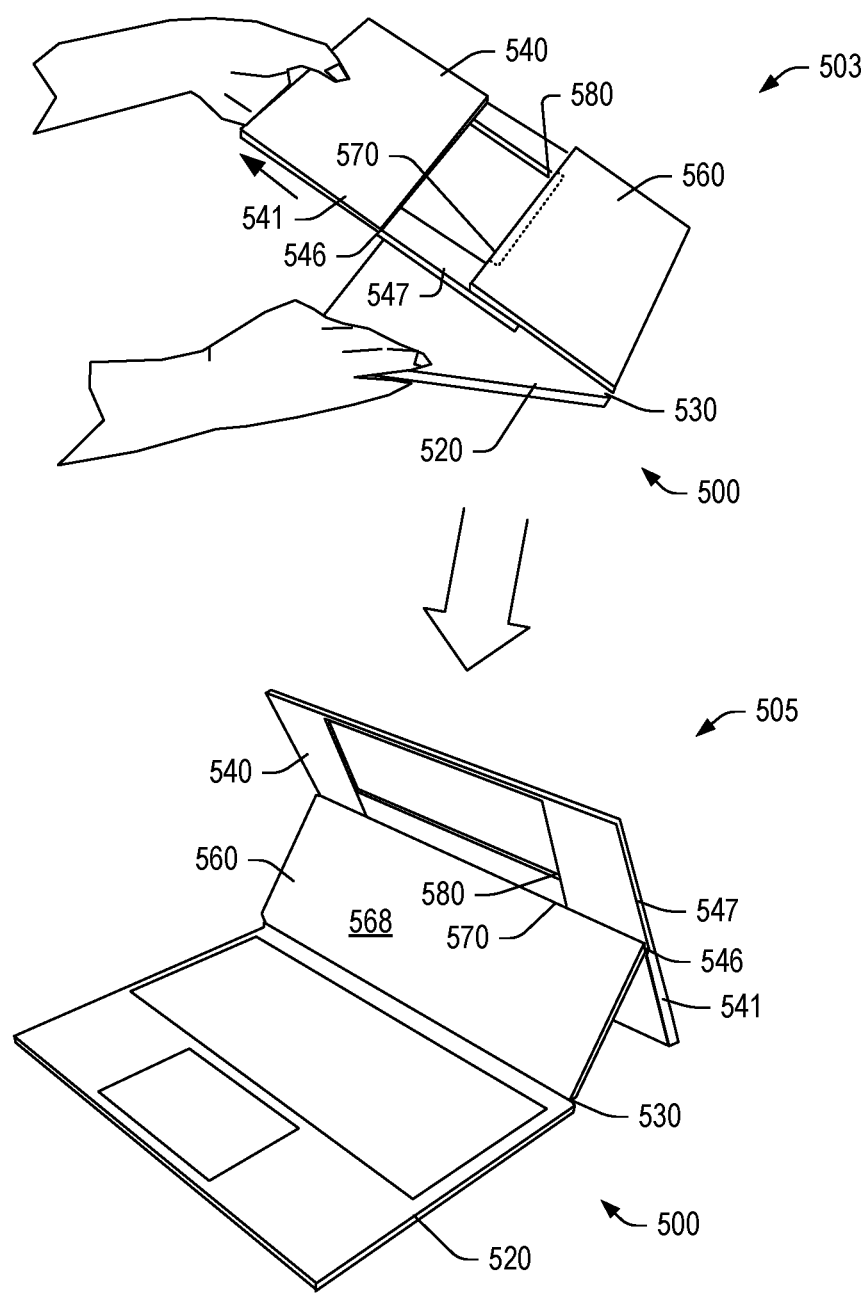
FIG. 7 is a diagram of the device of FIG. 5.

FIG. 7 shows the device 500 in two example orientations 503 and 505. As shown, the orientation 503 can be a transitional orientation to one or more other orientations. For example, consider a transition to an extended open orientation or a transition to a supported tent orientation such as the orientation 505.

Figure 8:
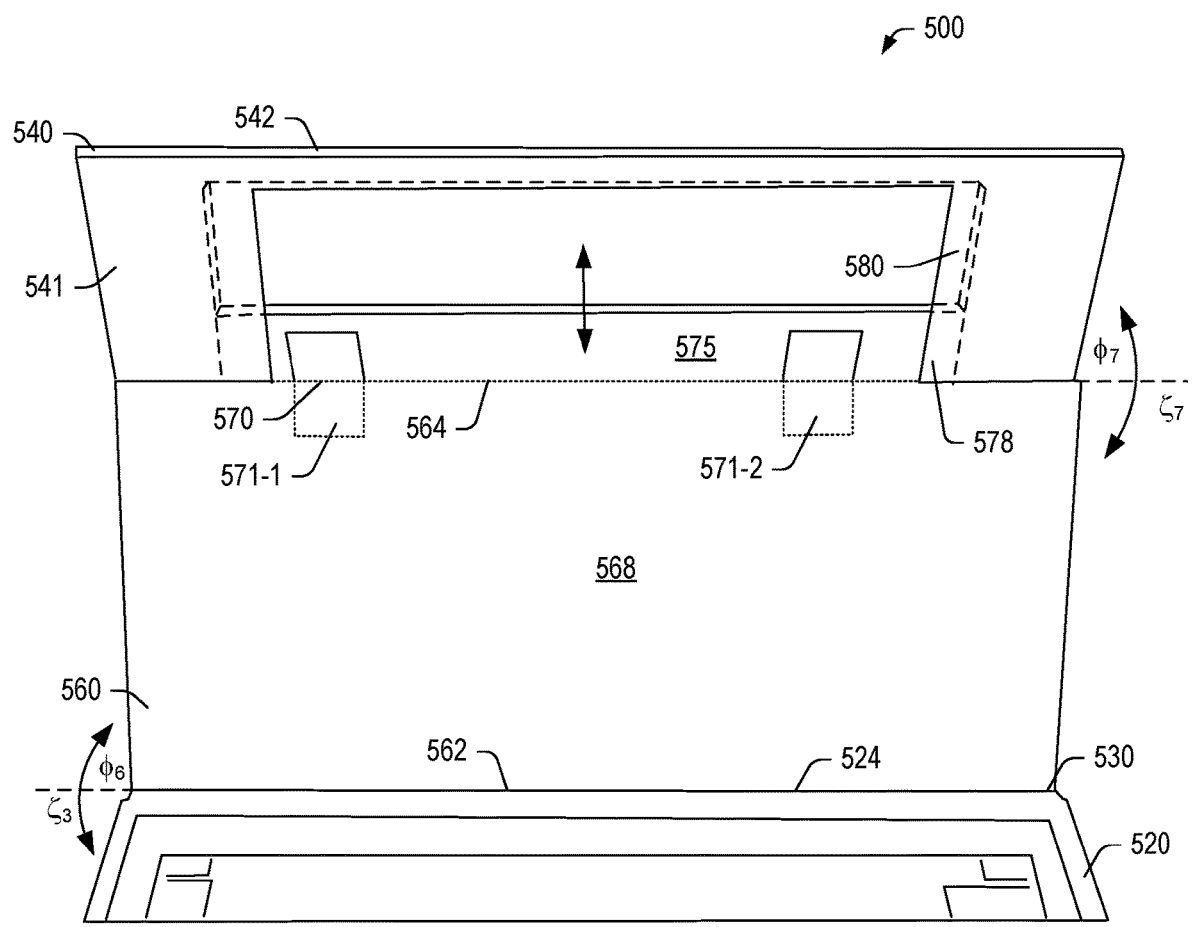
FIG. 8 is a diagram of the device of FIG. 5.

FIG. 8 shows a portion of the device 500 where the housing 540 includes the rail 580 as being a slotted rail where a plate 575 of the hinge assembly 570 includes a portion 578 that can be received by the rail 580 (e.g., noting that one or more rails may be included along with one or more portions receivable by the one or more rails). In such an example, the housing 540 can be guided by the rail 580, for example, the housing 540 can be translated in directions as indicated by a double-headed arrow where such translation is guided by the rail 580.

As shown in the example of FIG. 8, the hinge assembly 570 is operatively coupled to the housing 540 via the plate 575, which may be a planar plate, planar plates, etc.

In the example of FIG. 8, the housing 520 is shown as including the hinge edge 524, the housing 540 is shown as including the edge 542, and the housing 560 is shown as including the hinge edge 562 and the hinge edge 564 (e.g., as a first hinge edge and a second hinge edge). As shown, the first hinge edge 562 and the hinge edge 524 are at or proximate to the hinge assembly 530 while the second hinge edge 564 is at or proximate to the hinge assembly 570.

As an example, the hinge assembly 570 may include a material hinge assembly, a barrel and pin hinge assembly, a piano hinge assembly, etc. As an example, the hinge assembly 570 may include one or more hinges 571-1 and 571-2.

As to a material hinge assembly, consider a flexible material that is attached to the housings 540 and 560 where the flexible material can physically couple the housings 540 and 560 (e.g., being glued to, clipped to, and/or otherwise attached), optionally providing for one or more conductors that can electronically couple the housings 540 and 560 (e.g., and/or the housing 520). Such a flexible material may be a fabric (e.g., natural and/or synthetic). As an example, a flexible material may include one or more types of electrically conductive materials, which may be in the form of one or more traces, wires, circuits, etc.

As an example, the rail 580 may provide for maintaining a relatively planar orientation or orientations of the housings 540 and 560 where a position and/or force may be applied to transition from the relatively planar orientation to a bent orientation, for example, to form a tent shape. For example, consider the rail 580 including a maximum engaged position where translation beyond that maximum engaged position (e.g., beyond a rail end, etc.) may allow for rotation via the hinge assembly 570.

In the example of FIG. 8, the hinge assembly 570 can include the portion 578 as being pivotable about the axis $\zeta_7$ (e.g., consider the angle $\phi_7$) which may be at or proximate to the second hinge edge 564 of the housing 560. As shown in FIG. 8, the housings 520 and 560 can be pivotable about the axis $\zeta_3$ via the hinge assembly 530 (e.g., consider the angle $\phi_6$).

As an example, a device can include three housing and two hinge assemblies and a rail such that one of the housings is translatably positionable, which may be directly translatable (e.g., in a straight line) and/or indirectly translatable (e.g., translatably position at least in part via rotation).

As an example, the housing 540 may be detachable. For example, consider the rail 580 in the example of FIG. 8 as including an open portion or portions such that the portion 578 of the hinge assembly 570 can be removed from the rail 580 (e.g., or rails). As mentioned, the housing 540 can be operatively coupled to the hinge assembly 570 via the plate 575. Where the housing 540 can be separated from the plate 575, the housing 540 may be separated from the housing 560 and hence the housing 520. In such an example, the housing 540 may be operable as a tablet (e.g., a tablet display device, a tablet computer, etc.). As an example, one or more electrical connectors may be provided as part of the plate 575 where, for example, the rail 580 may include one or more corresponding electrical connectors. In such an example, circuitry may be coupled from the housing 560 via the hinge assembly 570 to the housing 540 where such circuitry may provide for transmission of one or more of power and data. As an example, the housing 540 may include wireless circuitry that can be operatively coupled to other wireless circuitry, which may be of an access point, of the housing 560 and/or the housing 520. As an example, where the housing 540 is attached or separated, such wireless circuitry may be utilized for transmission of at least data (e.g., for rendering information to the display surface 548 of the housing 540, etc.).

As explained, a device can include a slide and rotation mechanism that can be part of a hinge assembly. In such an example, one housing can be slid (e.g., translated) and rotated with respect to another housing. As an example, a sliding or translation mechanism can include one or more features. For example, consider a worm gear feature that meshes with another gear such that relatively smooth and controlled translation (e.g., sliding) occurs. As another example, consider one or more rollers, bearings, etc., which may be akin to a drawer mechanism. As an example, one or more magnets may be utilized, which, for example, may include indexed positions. For example, consider the rail 580 of the example of FIG. 8 as including magnets that can help a user adjust the plate 575 to thereby adjust the housing 540 with respect to the housing 560. In such an example, magnets may be indexed for an orientation that is a supported tent orientation (see, e.g., the orientation 205).

As an example, the plate 575 can include the portion 578 as a first end portion along with an opposing end portion where the opposing end portions may be made of a material such as synthetic polymer (e.g., TEFLON, NYLON, DELRIN, etc.). As an example, the rail 580 may be a first rail where a second opposing rail is provided in the housing 540.

As an example, such rails may be made of a material such as a synthetic polymer (e.g., TEFLON, NYLON, DELRIN, etc.). As an example, the end portions and rails may be configured with relatively tight tolerances such that a synthetic polymeric slider is formed by the end portions as received in synthetic polymeric rails.

Figure 9:
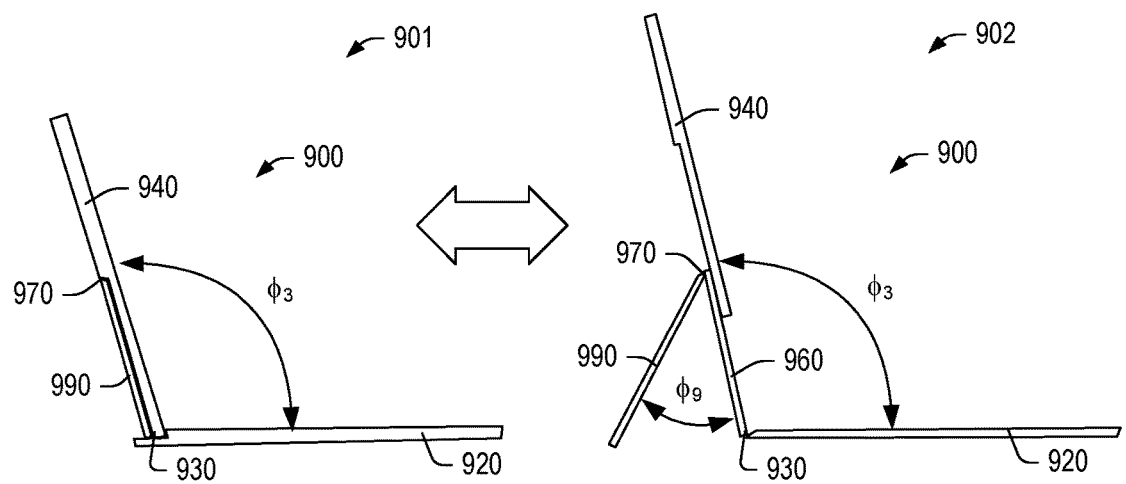
FIG. 9 is a series of diagrams of an example of a device.
Figure 9:
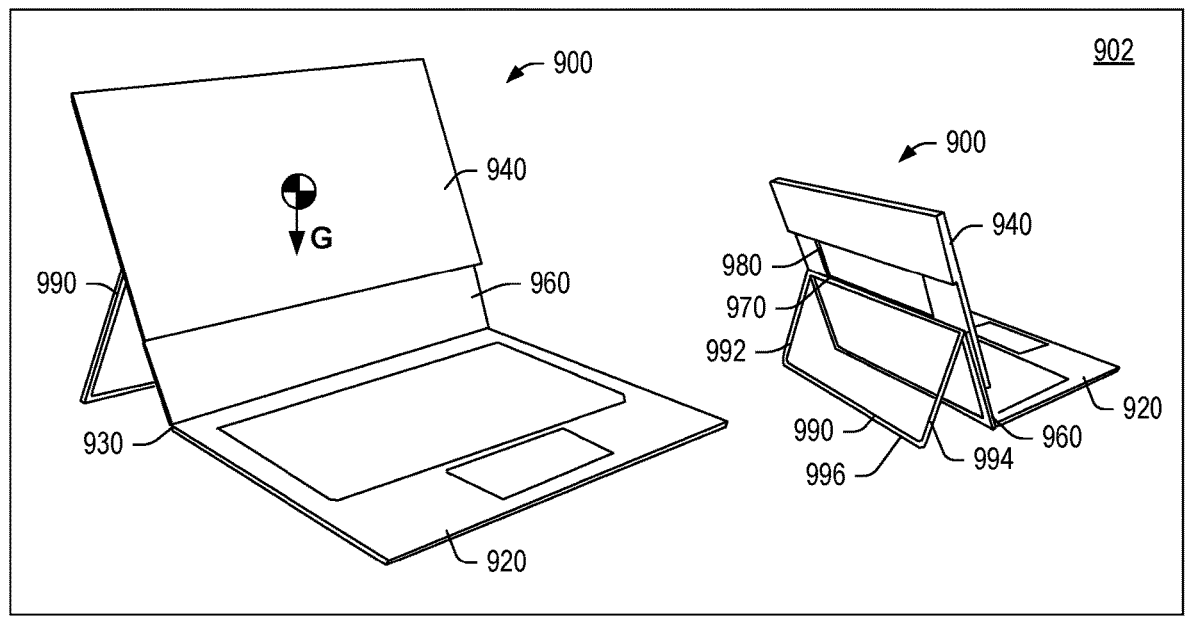

FIG. 9 shows an example of a device 900 in a first orientation 901 and a second orientation 902 where the device 900 includes housings 920, 940 and 960, hinge assemblies 930 and 970, a rail 980 and a stand 990. As shown, the housings 920 and 960 are operatively coupled via the hinge assembly 930 and the housing 960 and at least the stand 990 are operatively coupled via the hinge assembly 970. In the example of FIG. 9, the housing 940 can be translatably positioned with respect to the housing 960, for example, using the rail 980.

As shown in the example of FIG. 9, a center of gravity of the housing 940 can be adjustable, for example, via positioning of the housing 940 with respect to the housing 960. Where the center of gravity (cog) is increased, the stand 990 may be utilized to increase stability of the device 900 on a support surface (e.g., a desktop, a tabletop, a countertop, a lap, etc.). For example, the stand 990 can help stabilize the device 900 such that the device 900 does not rotate backwards (e.g., counter-clockwise in the example of FIG. 9); noting that the stand 990 may also help to reduce an amount of torque experienced by the hinge assembly 930. For example, if the hinge assembly 930 includes one or more friction elements (e.g., contacting components that generate frictional force), the stand 990 may provide for maintaining an angle $\phi_3$ between the housing 940 and the housing 920 by reducing the effect of the cog on the amount of torque.

In the example of FIG. 9, the stand 990 is shown as being substantially U-shaped in that it includes two uprights 992 and 994 and a cross-member 996. As an example, the housing 960 can include a recess that is shaped to accommodate the stand 990 such that the stand 990 can include a stored state and a deployed state. As shown, in the deployed state, an angle $\phi_9$ may be defined between the stand 990 and the housing 960. As an example, the stand 990 may be a kickstand, as a type of stand that can kick-out to support the housings 940 and/or 960.

As an example, a device can include three housings and a stand that can support the device on a support surface when one of the housings is in an extended state, for example, to enlarge display area viewable to a user. For example, in FIG. 9, the housing 940 can include a display and the housing 960 can include a display where the housing 940 can be positioned to extend the total display area of the device 500. As explained, in an extended open orientation or state, a center of gravity (cog) may be raised, which may increase a moment (e.g., torque), which may be with respect to a hinge assembly such as the hinge assembly 930. In such an example, a stand may help support a hinge assembly to maintain a desired angle and/or otherwise help to reduce risk of tipping backwards of a device.

FIG. 10 shows an example of a device 1000 in an extended supported display orientation 1008 and in an extended tent orientation 1009. As shown, the device 1000 includes housing 1020, 1040 and 1060, at least one hinge assembly 1030 and a rail 1080 that provides for translatably positioning the housing 1040 with respect to the housing 1060.

As an example, where the housing 1040 is a first display housing with a first display surface 1048 and the housing 1060 is a second display housing with a second display surface 1068, the extended supported display orientation 1008 can have the first display surface 1048 positioned above the second display surface 1068; whereas, in the extended tent orientation 1009, the second display surface 1068 can be positioned above the first display surface 1048. In such examples, one or both of the display surfaces 1048 and 1068 may be touch-screen display surfaces where a user may utilize a finger, fingers, a stylus, etc., for input to the device 1000. For example, consider the orientation 1008 where the display surface 1048 can render video content and where the display surface 1068 can render commentary on the video content as may be available via one or more social media and/or one or more other types of platforms (e.g., services, etc.). In such an example, a user may view the rendered video content and the rendered commentary. As an example, the display surface 1048 may render presentation content, for example, as part of a course where, for example, the display surface 1068 renders commentary (e.g., comments, questions, etc.) as to the presentation content. In such an example, an instructor and/or a student using the device 1000 can be informed about the presentation content and the commentary and, for example, may participate in the commentary (e.g., posting questions, comments, etc., answering questions, etc.).

In the example orientation 1009, content may be rendered to the display surface 1068 that may pertain to video content rendered to the display surface 1048. In such an example, a larger display area may be utilized for rendering video content and a smaller display area may be utilized for rendering information pertaining to the video content. For example, consider one or more graphical controls for chapters, episodes, etc., being rendered to the display surface 1068 where a user can interact with such graphical controls using a finger, fingers, a stylus, a mouse, etc., to control rendering of video content to the display surface 1048. As an example, consider a history series on ancient Egypt that includes 10 episodes. In such an approach, episode titles may be rendered to the display surface 1068 that are selectable to call for rendering of an episode as video content to the display surface 1048.

As an example, the supported tent orientation 205 or 305 of FIGS. 2 and 3 may be utilized for collaborative scenarios where two or more people are present. For example, FIG. 4 shows the orientation 405 as including two people where one person can utilize a first display surface of a first display housing and where another person can utilize a second display surface of a second display housing. In such an example, one person may use one of the display surfaces to control content rendered to the other of the display surfaces. For example, one person may give a presentation to another person where the people are on different sides of the device 400. In such an example, the viewing angle may be optimal for each person; whereas, when two people are positioned on the same side of a device, the viewing angle for at least one of the two people tends to be suboptimal.

As an example, the device 1000 may automatically instantiate an application and/or render a graphical user interface (GUI) to the display surface 1068 upon transition to an extended orientation that provides for viewing the display surface 1048 and the display surface 1068. For example, consider one or more sensors that can detect a change in orientation and call for rendering of an email application GUI or another type of electronic messaging GUI.

Figure 11:
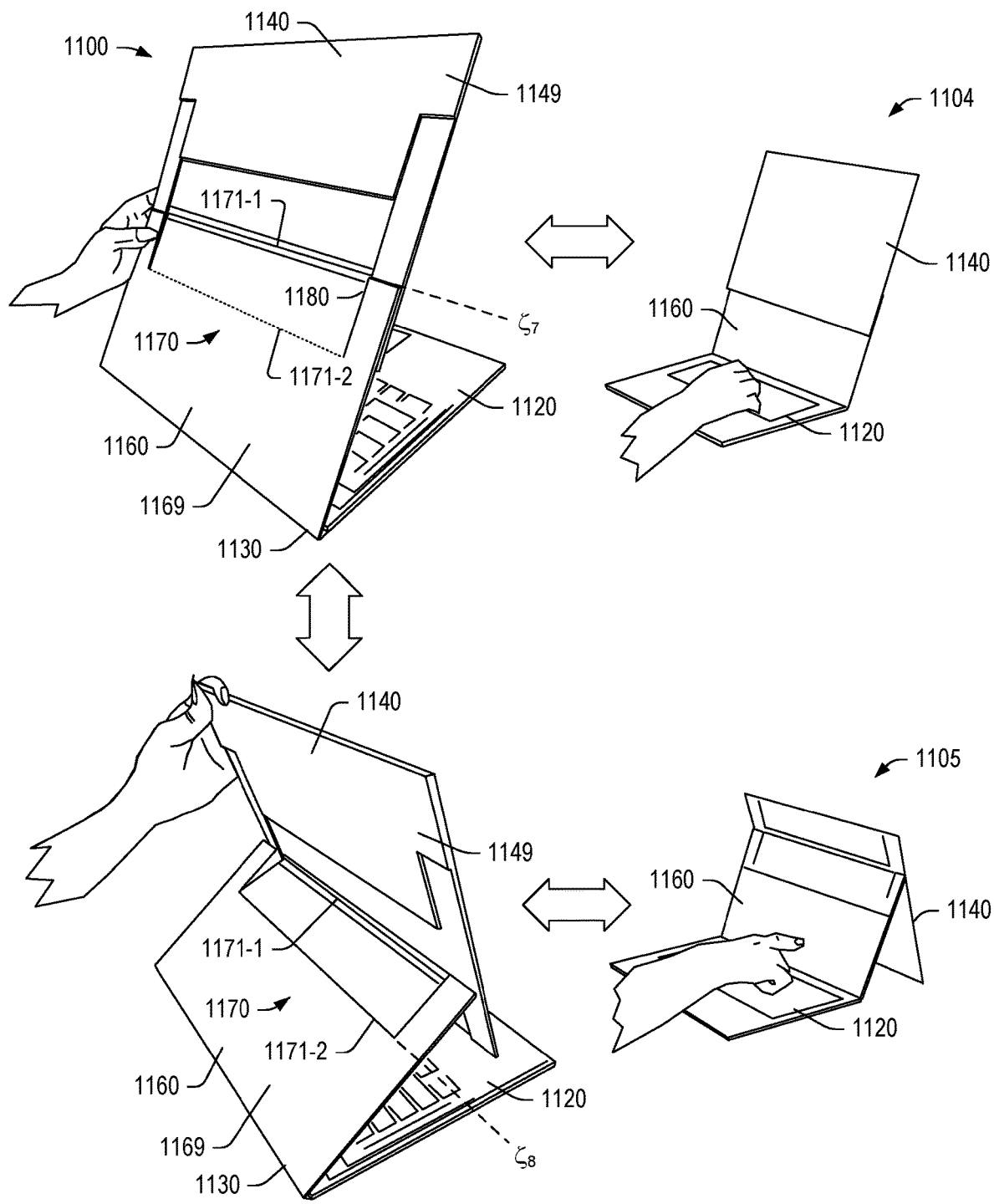
FIG. 11 is a series of diagrams of an example of a device.

FIG. 11 shows an example of a device 1100 that includes housing 1120, 1140 and 1160, a hinge assembly 1130, a hinge assembly 1170 and a rail 1180. As shown, the device 1100 can provide an extended open orientation 1104 and a supported tent orientation 1105.

In the example of FIG. 11, the hinge assembly 1170 can include two hinges 1171-1 and 1171-2 with respective hinge axes $\zeta_7$ and $\zeta_8$. As shown, the back side 1149 of the housing 1140 can include a section that may be substantially U-shaped that can cooperate with various features of the back side 1169 of the housing 1160, which may be substantially U-shaped. For example, consider one or more key and keyway features that can provide for interlocking.

As shown in the orientation 1104, the hinges 1171-1 and 1171-2 can be defined by leaf portions that are planar while, in the orientation 1105, at least the hinge 1171-1 includes leaf portions that are not planar.

Figure 12:
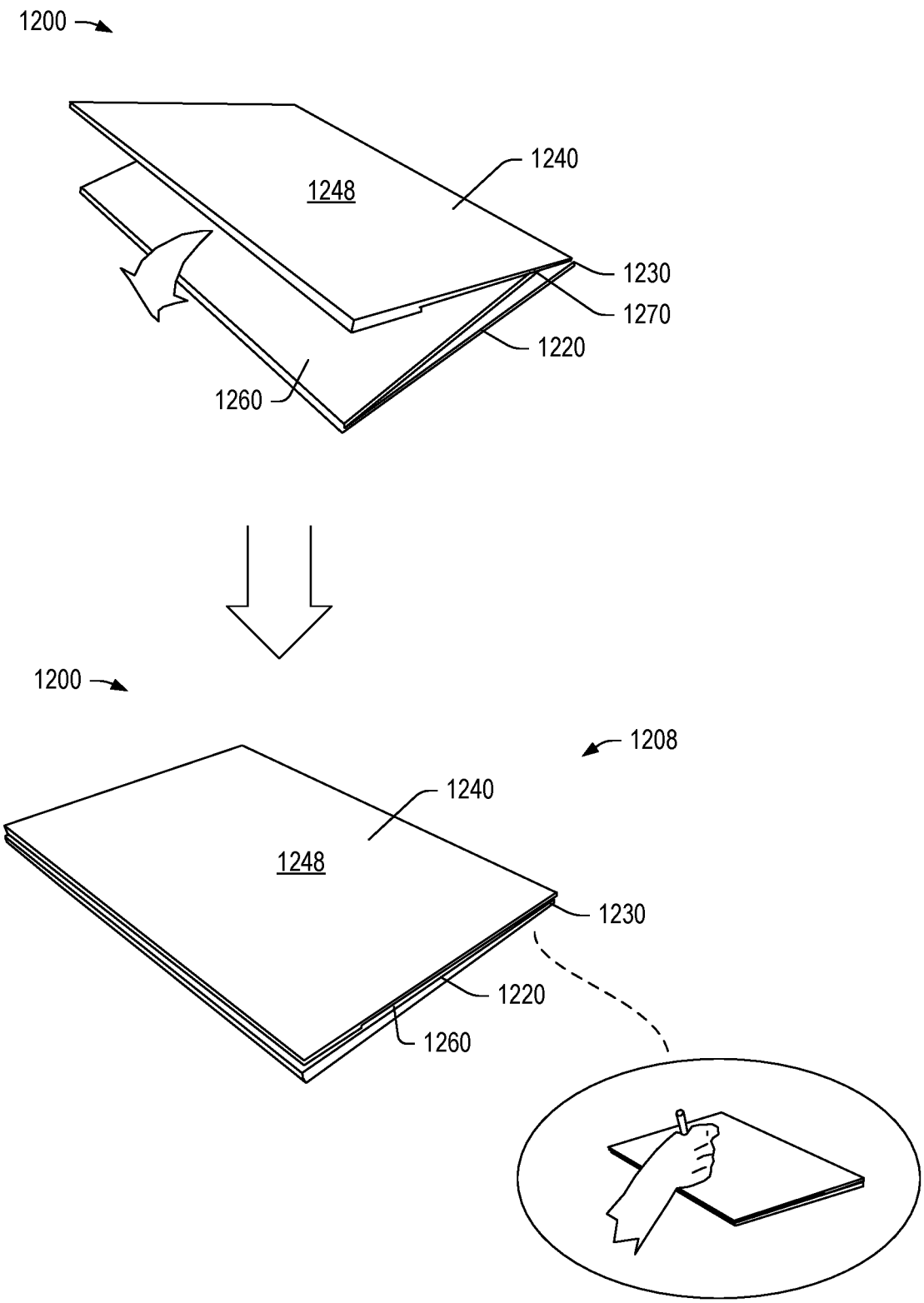
FIG. 12 is a series of diagrams of an example of a device.

FIG. 12 shows an example of a device 1200 that includes housing 1220, 1240 and 1260 and hinge assemblies 1230 and 1270. As shown, the device 1200 can be oriented in a tablet orientation 1208 where a display surface 1248 of the housing 1240 may be disposed at an angle that is suitable for drawing, for example, using a finger, fingers, a stylus, etc.

As an example, a device can be a multi-display device that can provide display area or display areas that can enhance a user's experience as to one or more types of applications. For example, consider an application that includes multiple tool sets, drop down menus, workspace panels, bars, etc. As an example, a multi-display device may be oriented for rendering primary content to one display area (e.g., a canvas, imagery, drawing, video, etc.) and secondary content to another display area (e.g., tools, menus, etc.). As an example, such a multi-display device may also be oriented for collaborative tasks where one display area faces one direction and another display area faces another direction. In such an example, one of the display areas may be for primary content and the other for secondary content. For example, consider a slide presentation as primary content and control graphics for controlling the slide presentation as secondary content. In such an example, a presenter may be positioned to one side of the device while a viewer may be positioned to the other side of the device. In such an example, the primary content of the slide presentation may include content generated by the presenter using the device in a different orientation. As an example, a multi-display device can include a display with a display area less than another display. For example, a smaller display may have a display area that is less than 50 percent of the larger display or, for example, approximately 40 percent or less and greater than 10 percent of the larger display. As an example, a smaller display of a device may have a display area that is less than approximately 40 percent and greater than approximately 30 percent of a display area of a larger display of the device (e.g., consider approximately 37 percent, etc.). As an example, a display area of a smaller display may be related to types of orientations. For example, a 37 percent display area of a housing of substantially the same width as a 100 percent display area of another housing may provide, geometrically, for various tent orientations, including, for example, a supported tent orientation.

As an example, an apparatus can include a processor; memory accessible to the processor; a first housing that includes opposing end edges, opposing side edges and a first display; a second housing that includes a second display; a third housing; a rail that guides translation of the first housing with respect to the second housing; a first hinge assembly that operatively couples the first housing and the second housing; and a second hinge assembly that pivotably couples the second housing and the third housing. In such an example, the apparatus can include circuitry that controls orientation of an image rendered to the first display responsive to rotation of the first housing via the first hinge assembly. For example, for a controlled change in the orientation of the image rendered to the first display, the circuitry can maintain an orientation of an image rendered to the second display.

As an example, an apparatus can include circuitry, where in a translated position of a first housing with respect to a second housing, the circuitry renders images to a first display of the first housing and a second display of the second housing with a common orientation.

As an example, an apparatus can include circuitry that renders an image to a first display of a first housing in a first tent orientation and that renders images to the first display and a second display of a second housing in a second tent orientation. For example, in the first tent orientation, the first display can be exposed and the second display can be hidden by the first display and, in the second tent orientation, the first display and the second display can be exposed and face different directions. For example, consider, in the first tent orientation, one of opposing edges of the first housing and a third housing defining contact support surfaces and, in the second tent orientation, the one of the opposing edges of the first housing and the third housing defining contact support surfaces. In such an example, in the first tent orientation, a bottom surface of the third housing can define one of the contact support surfaces and, in the second tent orientation, an edge of the third housing can define one of the contact support surfaces.

As an example, a second housing of an apparatus can include an area defined by a width and a height, where the height is less than a distance between opposing edges of a first housing of the apparatus.

As an example, a rail can be operatively coupled to a first hinge assembly of an apparatus. For example, the rail may provide for translational movement that can adjust a hinge axis of the first hinge assembly.

As an example, an apparatus can be oriented in one of a closed clamshell orientation, an open clamshell orientation and an open extended display clamshell orientation, where a first display of the apparatus is positioned above a second display of the apparatus.

As an example, an apparatus can be oriented in a tablet orientation, where a first housing is anti-parallel to a third housing and where a second housing is disposed between the first housing and the third housing.

As an example, an apparatus can include circuitry that activates a second display responsive to translation of a first housing that translates the first housing away from the second housing. In such an example, the circuitry can deactivate the second display responsive to translation of the first housing that translates the first housing toward the second housing.

As an example, an apparatus can be oriented in a tent orientation where a first display of a first housing and a second display of a second housing are exposed and where the second housing forms an angle with a third housing that is less than 180 degrees.

As an example, an apparatus can be oriented in a tent orientation where a first display of the apparatus and a second display of the apparatus are exposed and face a common direction.

As an example, in a closed clamshell orientation of an apparatus, a first display of a first housing and a second display of a second housing are not exposed; in an open clamshell orientation, the first display is exposed; and, in an open extended display clamshell orientation, the first display and the second display are exposed and the first display is positioned above the second display. In such an example, in a tablet orientation, the first housing is anti-parallel to the third housing and the second housing is disposed between the first housing and the third housing.

As an example, in a tent orientation of an apparatus, a first display of a first housing and a second display of a second housing are exposed and the second housing forms an angle with a third housing that is less than 180 degrees.

As an example, in a tent orientation of an apparatus, a first display of a first housing and a second display of a second housing are exposed and face a common direction.

As an example, an apparatus can include a first housing, a second housing and a third housing where third housing includes a processor, memory and a keyboard and optionally a touchpad.

As an example, a first housing of an apparatus can define a recess for at least a portion of a second housing of the apparatus. As an example, a first housing of an apparatus can define a recess for at least a portion of a rail.

As an example, an apparatus can include a kickstand. For example, consider a kickstand that can extend from a housing to support the housing and optionally another housing. In such an example, where the housings are display housings, they may be stacked in a manner whereby one of the displays is positioned above the other one of the displays.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 13:
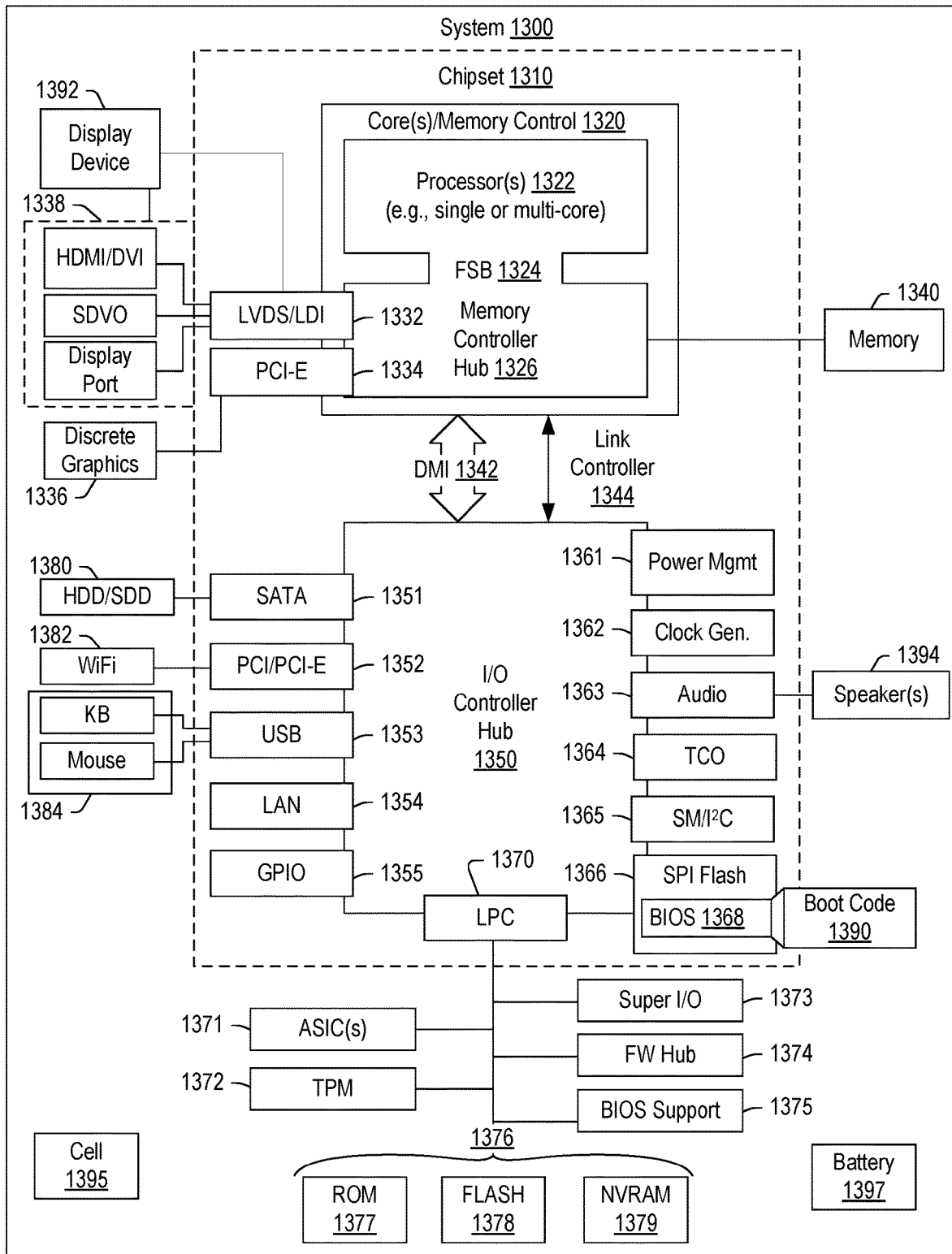
FIG. 13 is a diagram of an example of a system that includes one or more processors.

While various examples of circuits or circuitry have been discussed, FIG. 13 depicts a block diagram of an illustrative computer system 1300. The system 1300 may be a computer system, such as one of the ThinkCentre® or ThinkPad® series of personal computers sold by Lenovo (US) Inc. of Morrisville, N.C., or a workstation computer system, such as the ThinkStation®, which are sold by Lenovo (US) Inc. of Morrisville, N.C.; however, as apparent from the description herein, a system or other machine may include other features or only some of the features of the system 1300. As an example, a device 200, 300, 400, 500, 900, 1000, 1100, 1200, etc., may include at least some of the features of the system 1300.

As shown in FIG. 13, the system 1300 includes a so-called chipset 1310. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 13, the chipset 1310 has a particular architecture, which may vary to some extent depending on brand or manufacturer. The architecture of the chipset 1310 includes a core and memory control group 1320 and an I/O controller hub 1350 that exchange information (e.g., data, signals, commands, etc.) via, for example, a direct management interface or direct media interface (DMI) 1342 or a link controller 1344. In the example of FIG. 13, the DMI 1342 is a chip-to-chip interface (sometimes referred to as being a link between a "northbridge" and a "southbridge").

The core and memory control group 1320 include one or more processors 1322 (e.g., single core or multi-core) and a memory controller hub 1326 that exchange information via a front side bus (FSB) 1324. As described herein, various components of the core and memory control group 1320 may be integrated onto a single processor die, for example, to make a chip that supplants the conventional "northbridge" style architecture.

The memory controller hub 1326 interfaces with memory 1340. For example, the memory controller hub 1326 may provide support for DDR SDRAM memory (e.g., DDR, DDR2, DDR3, etc.). In general, the memory 1340 is a type of random-access memory (RAM). It is often referred to as "system memory".

The memory controller hub 1326 further includes a low-voltage differential signaling interface (LVDS) 1332. The LVDS 1332 may be a so-called LVDS Display Interface (LDI) for support of a display device 1392 (e.g., a CRT, a flat panel, a projector, etc.). A block 1338 includes some examples of technologies that may be supported via the LVDS interface 1332 (e.g., serial digital video, HDMI/DVI, display port). The memory controller hub 1326 also includes one or more PCI-express interfaces (PCI-E) 1334, for example, for support of discrete graphics 1336. Discrete graphics using a PCI-E interface has become an alternative approach to an accelerated graphics port (AGP). For example, the memory controller hub 1326 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1350 includes a variety of interfaces. The example of FIG. 13 includes a SATA interface 1351, one or more PCI-E interfaces 1352 (optionally one or more legacy PCI interfaces), one or more USB interfaces 1353, a LAN interface 1354 (more generally a network interface), a general purpose I/O interface (GPIO) 1355, a low-pin count (LPC) interface 1370, a power management interface 1361, a clock generator interface 1362, an audio interface 1363 (e.g., for speakers 1394), a total cost of operation (TCO) interface 1364, a system management bus interface (e.g., a multi-master serial computer bus interface) 1365, and a serial peripheral flash memory/controller interface (SPI Flash) 1366, which, in the example of FIG. 13, includes BIOS 1368 and boot code 1390. With respect to network connections, the I/O hub controller 1350 may include integrated gigabit Ethernet controller lines multiplexed with a PCI-E interface port. Other network features may operate independent of a PCI-E interface.

The interfaces of the I/O hub controller 1350 provide for communication with various devices, networks, etc. For example, the SATA interface 1351 provides for reading, writing or reading and writing information on one or more drives 1380 such as HDDs, SDDs or a combination thereof. The I/O hub controller 1350 may also include an advanced host controller interface (AHCI) to support one or more drives 1380. The PCI-E interface 1352 allows for wireless connections 1382 to devices, networks, etc. The USB interface 1353 provides for input devices 1384 such as keyboards (KB), one or more optical sensors, mice and various other devices (e.g., microphones, cameras, phones, storage, media players, etc.). On or more other types of sensors may optionally rely on the USB interface 1353 or another interface (e.g., I²C, etc.). As to microphones, the system 1300 of FIG. 13 may include hardware (e.g., audio card) appropriately configured for receipt of sound (e.g., user voice, ambient sound, etc.).

In the example of FIG. 13, the LPC interface 1370 provides for use of one or more ASICs 1371, a trusted platform module (TPM) 1372, a super I/O 1373, a firmware hub 1374, BIOS support 1375 as well as various types of memory 1376 such as ROM 1377, Flash 1378, and non-volatile RAM (NVRAM) 1379. With respect to the TPM 1372, this module may be in the form of a chip that can be used to authenticate software and hardware devices. For example, a TPM may be capable of performing platform authentication and may be used to verify that a system seeking access is the expected system.

The system 1300, upon power on, may be configured to execute boot code 1390 for the BIOS 1368, as stored within the SPI Flash 1366, and thereafter processes data under the control of one or more operating systems and application software (e.g., stored in system memory 1340). An operating system may be stored in any of a variety of locations and accessed, for example, according to instructions of the BIOS 1368. Again, as described herein, a satellite, a base, a server or other machine may include fewer or more features than shown in the system 1300 of FIG. 13. Further, the system 1300 of FIG. 13 is shown as optionally include cell phone circuitry 1395, which may include GSM, CDMA, etc., types of circuitry configured for coordinated operation with one or more of the other features of the system 1300. Also shown in FIG. 13 is battery circuitry 1397, which may provide one or more battery, power, etc., associated features (e.g., optionally to instruct one or more other components of the system 1300). As an example, a SMBus may be operable via a LPC (see, e.g., the LPC interface 1370), via an I²C interface (see, e.g., the SM/I²C interface 1365), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
   a processor;
   memory accessible to the processor;
   a first housing that comprises opposing end edges, opposing side edges and a first display;
   a second housing that comprises a second display;
   a third housing that comprises a keyboard;
   a rail that guides translation of the first housing with respect to the second housing;
   a first hinge assembly that operatively couples the first housing and the second housing; and
   a second hinge assembly that pivotably couples an end of the second housing and an end of the third housing, wherein the rail is operatively coupled to the first hinge assembly, and wherein guided translation of the first housing via the rail determines a position of the first hinge assembly for pivotable movement of the first housing via the first hinge assembly.

2. The apparatus of claim 1, comprising circuitry that controls orientation of an image rendered to the first display responsive to rotation of the first housing via the first hinge assembly.

3. The apparatus of claim 2, wherein, for a controlled change in the orientation of the image rendered to the first display, the circuitry maintains an orientation of an image rendered to the second display.

4. The apparatus of claim 1, comprising circuitry, wherein in a translated position of the first housing with respect to the second housing, the circuitry renders images to the first display and the second display with a common orientation.

5. The apparatus of claim 1, comprising circuitry that renders an image to the first display in a first tent orientation and that renders images to the first display and the second display in a second tent orientation.

6. The apparatus of claim 5, wherein, in the first tent orientation, the first display is exposed and the second display is hidden by the first display and wherein, in the second tent orientation, the first display and the second display are exposed and face different directions.

7. The apparatus of claim 6, wherein, in the first tent orientation, one of the opposing edges of the first housing and the third housing define contact support surfaces and, wherein, in the second tent orientation, the one of the opposing edges of the first housing and the third housing define contact support surfaces.

8. The apparatus of claim 7, wherein, in the first tent orientation, a bottom surface of the third housing defines one of the contact support surfaces and wherein, in the second tent orientation, an edge of the third housing defines one of the contact support surfaces.

9. The apparatus of claim 1, wherein the second housing comprises an area defined by a width and a height, wherein the height is less than a distance between the opposing edges of the first housing.

10. The apparatus of claim 1, wherein, in a closed clamshell orientation, the first display and the second display are not exposed, wherein, in an open clamshell orientation, the first display is exposed, and wherein, in an open extended display clamshell orientation, the first display and the second display are exposed and the first display is positioned above the second display.

11. The apparatus of claim 1, wherein, in a tablet orientation, the first housing is anti-parallel to the third housing and the second housing is disposed between the first housing and the third housing.

12. The apparatus of claim 1, comprising circuitry that activates the second display responsive to translation of the first housing that translates the first housing away from the second housing.

13. The apparatus of claim 12, wherein the circuitry deactivates the second display responsive to translation of the first housing that translates the first housing toward the second housing.

14. The apparatus of claim 1, wherein, in a tent orientation, the first display and the second display are exposed and the second housing forms an angle with the third housing that is less than 180 degrees.

15. The apparatus of claim 1, wherein, in a tent orientation, the first display and the second display are exposed and face a common direction.

16. The apparatus of claim 1, wherein the third housing comprises the processor and the memory.

17. The apparatus of claim 1, wherein the first housing defines a recess for at least a portion of the second housing.

18. The apparatus of claim 1, wherein the first housing defines a recess for at least a portion of the rail.

19. The apparatus of claim 1, comprising a kickstand.

* * * * *